(No Model.)  10 Sheets—Sheet 1.

W. J. HOOPER.
MACHINE FOR MAKING NETS.

No. 484,893.  Patented Oct. 25, 1892.

Witnesses
G. A. Tauberschmidt
H. B. Reinohl

Inventor
W. J. Hooper
By Johnston & Reinohl
Attorneys

THE NORRIS PETERS CO., PHOTO-LITHO., WASHINGTON, D. C.

(No Model.) 10 Sheets—Sheet 2.
W. J. HOOPER.
MACHINE FOR MAKING NETS.

No. 484,893. Patented Oct. 25, 1892.

Fig. 2.

Witnesses
G. A. Tauberschmidt
H. B. Reinohl

Inventor
W. J. Hooper
By Johnston & Reinohl
Attorneys (No Model.) 10 Sheets—Sheet 3.

W. J. HOOPER.
MACHINE FOR MAKING NETS.

No. 484,893. Patented Oct. 25, 1892.

(No Model.)  10 Sheets—Sheet 4.

W. J. HOOPER.
MACHINE FOR MAKING NETS.

No. 484,893. Patented Oct. 25, 1892.

Witnesses
I. A. Tauberschmidt
H. B. Reinohl

Inventor
W. J. Hooper
By Johnston & Reinohl
Attorneys

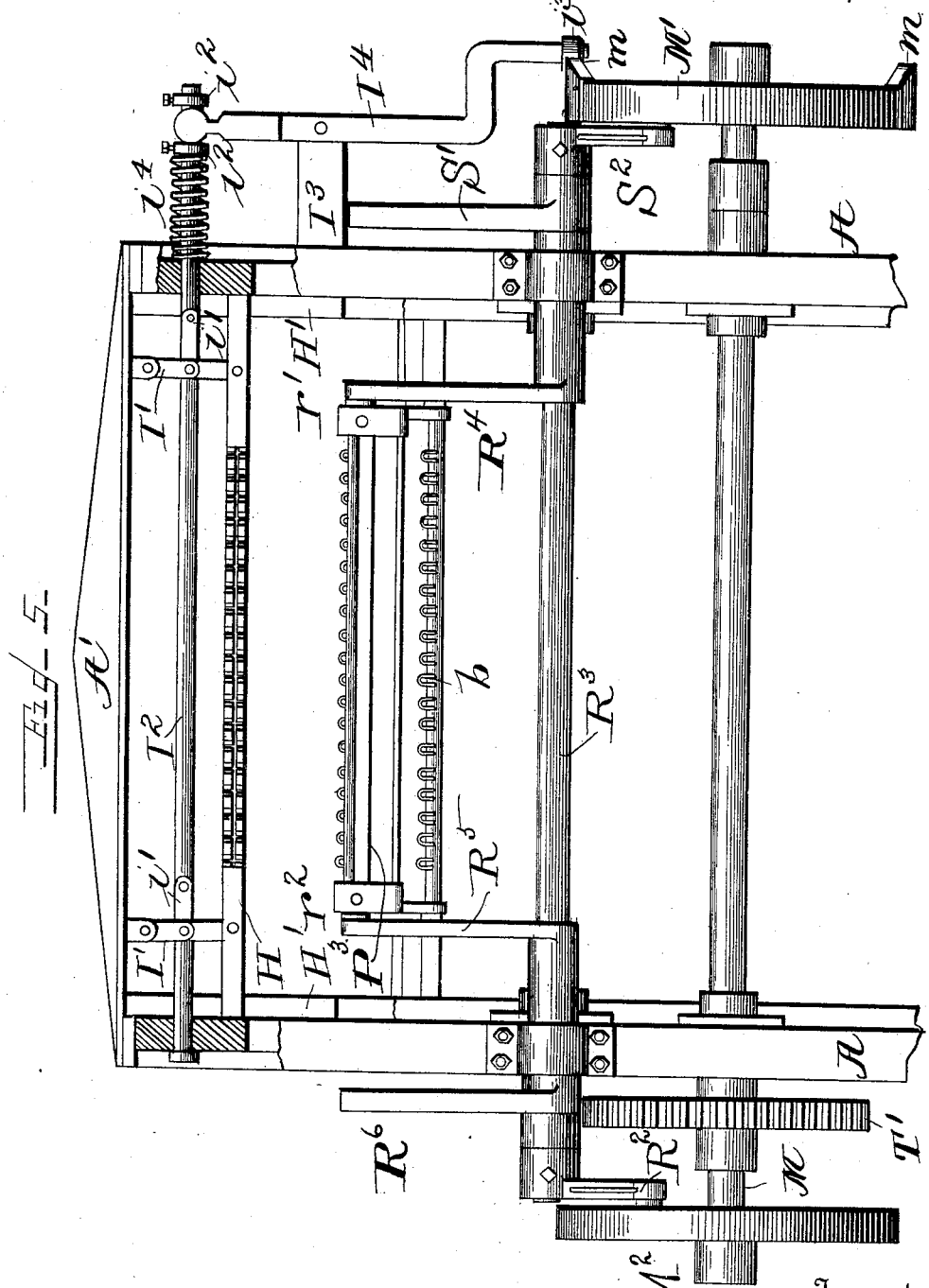

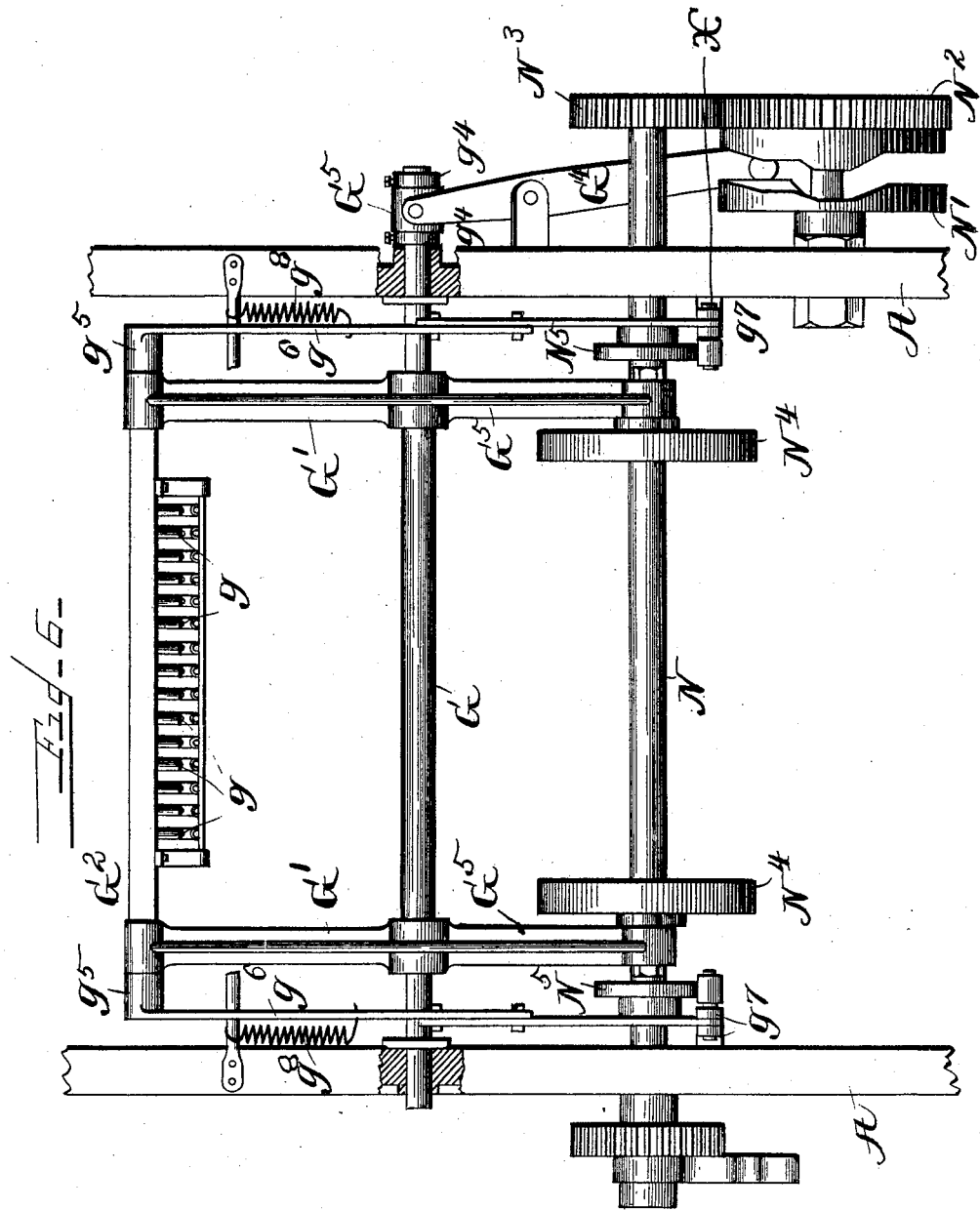

(No Model.) 10 Sheets—Sheet 7.
W. J. HOOPER.
MACHINE FOR MAKING NETS.
No. 484,893. Patented Oct. 25, 1892.
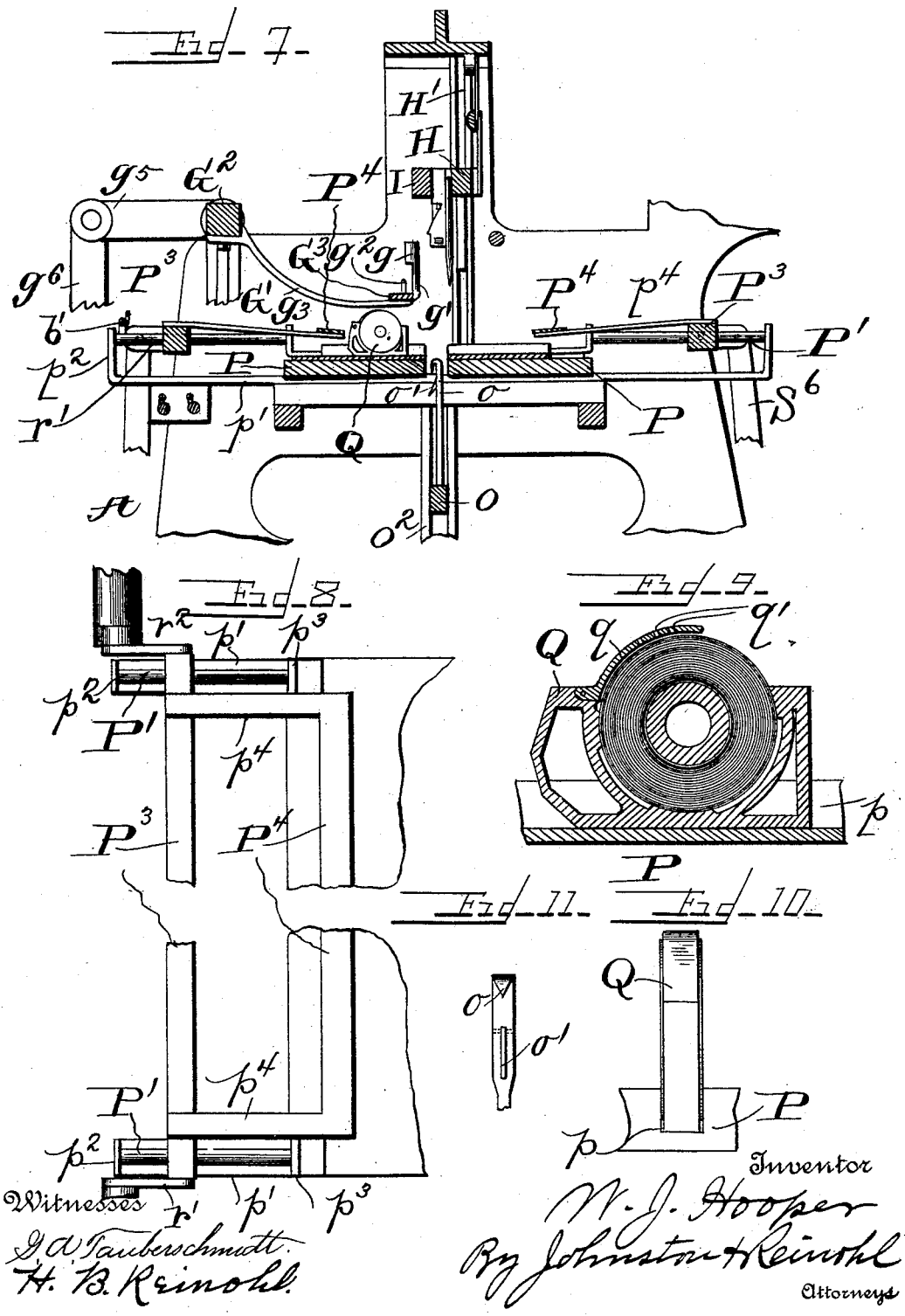

(No Model.) 10 Sheets—Sheet 8.
W. J. HOOPER.
MACHINE FOR MAKING NETS.
No. 484,893. Patented Oct. 25, 1892.
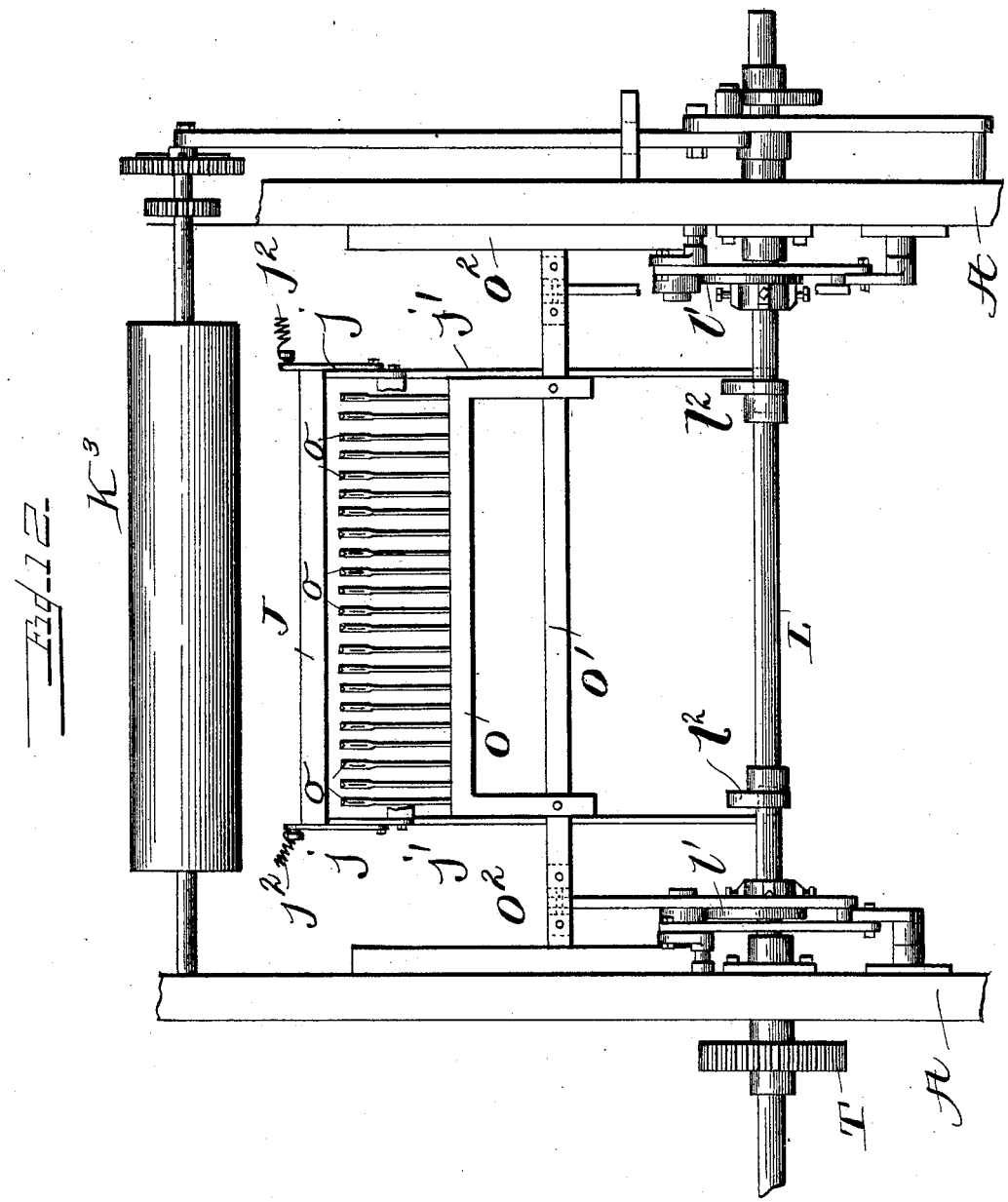
Witnesses
D. A. Tauberschmidt
H. B. Reinohl
Inventor
W. J. Hooper
By Johnston & Reinohl
Attorneys (No Model.) 10 Sheets—Sheet 9.
W. J. HOOPER.
MACHINE FOR MAKING NETS.
No. 484,893. Patented Oct. 25, 1892.
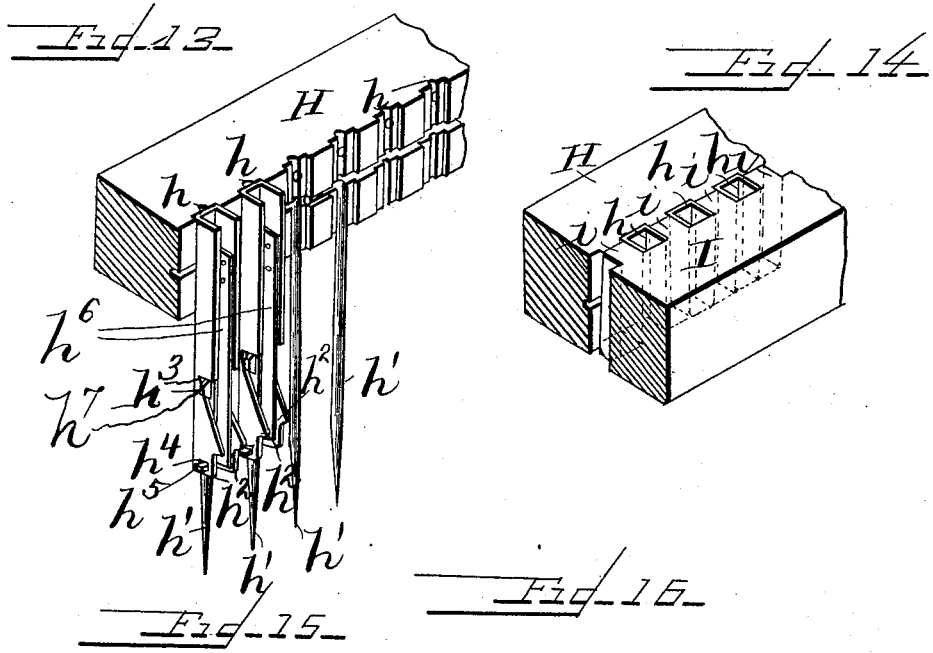
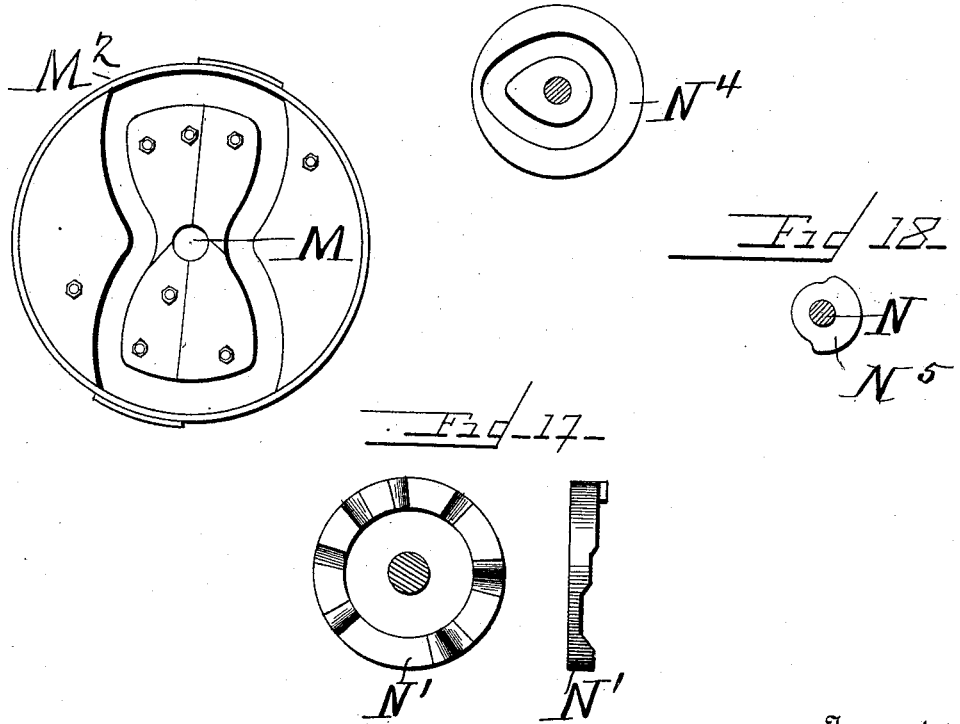
Witnesses
G. A. Tauberschmidt
H. B. Reinohl
Inventor
W. J. Hooper
By Johnston & Reinohl
Attorneys (No Model.) 10 Sheets—Sheet 10.
W. J. HOOPER.
MACHINE FOR MAKING NETS.
No. 484,893. Patented Oct. 25, 1892.
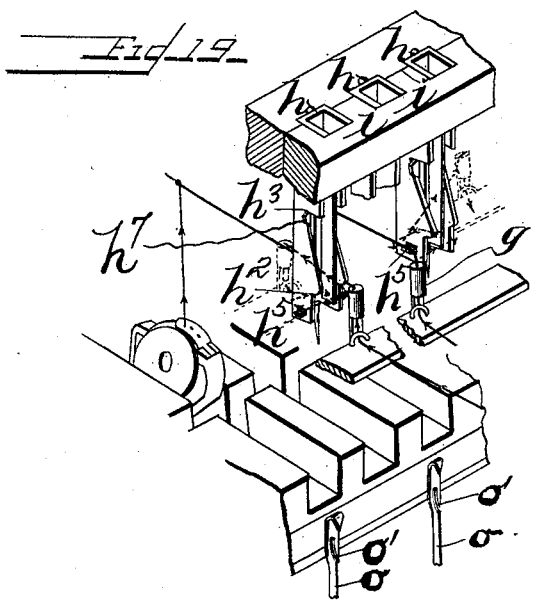
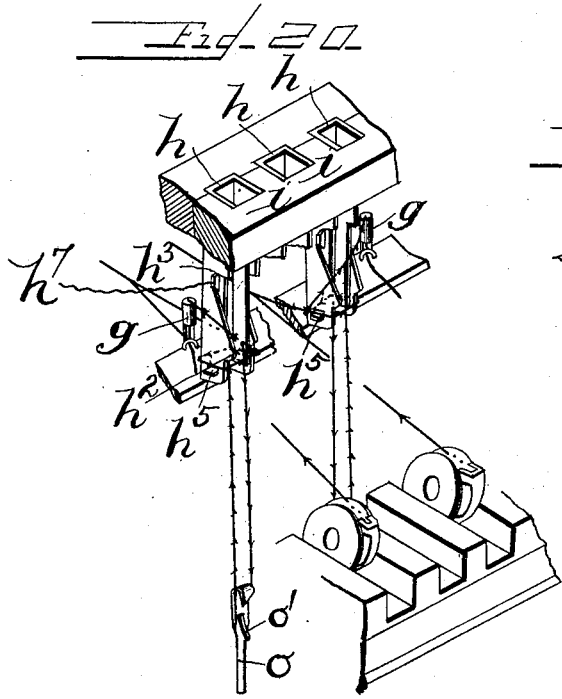
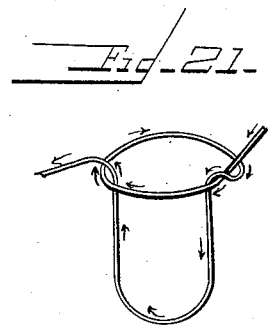
Witnesses
Inventor

UNITED STATES PATENT OFFICE.

WILLIAM J. HOOPER, OF BALTIMORE, MARYLAND.

MACHINE FOR MAKING NETS.

SPECIFICATION forming part of Letters Patent No. 484,893, dated October 25, 1892.

Application filed August 6, 1891. Serial No. 401,863. (No model.)

*To all whom it may concern:*

Be it known that I, WILLIAM J. HOOPER, a citizen of the United States, residing at Baltimore, in the State of Maryland, have invented certain new and useful Improvements in Machines for Making Nets; and I do hereby declare the following to be a full, clear, and exact description of the invention, such as will enable others skilled in the art to which it appertains to make and use the same.

My present invention is an improved machine for making nets, my improvements consisting in certain improved parts and combinations of parts whereby the action is made certain and liability of faults and errors is avoided.

In the accompanying drawings I have shown the best form in which I have contemplated embodying my invention, and my said invention is disclosed in the following description and claims.

Figure 1:
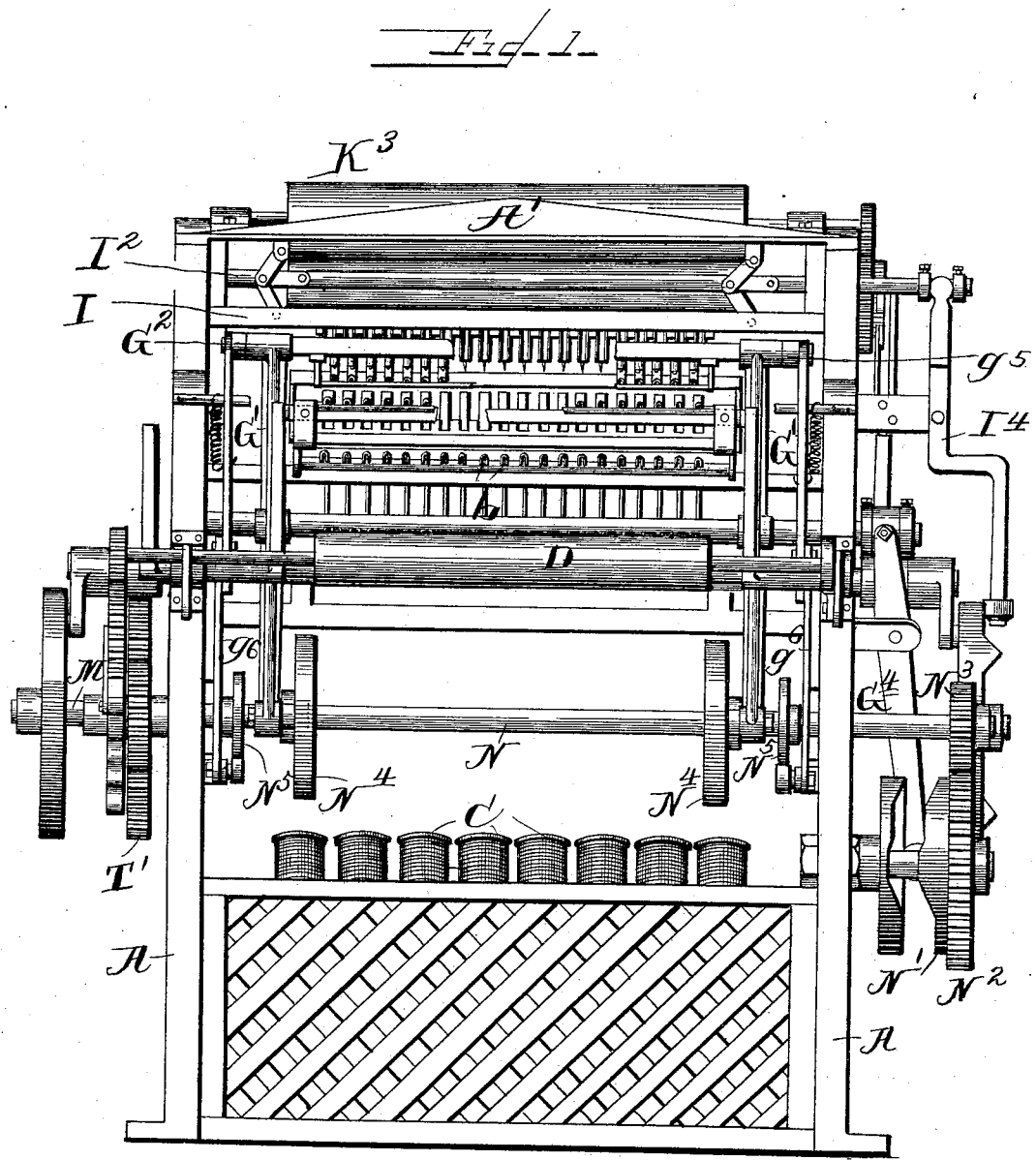
Figure 3:
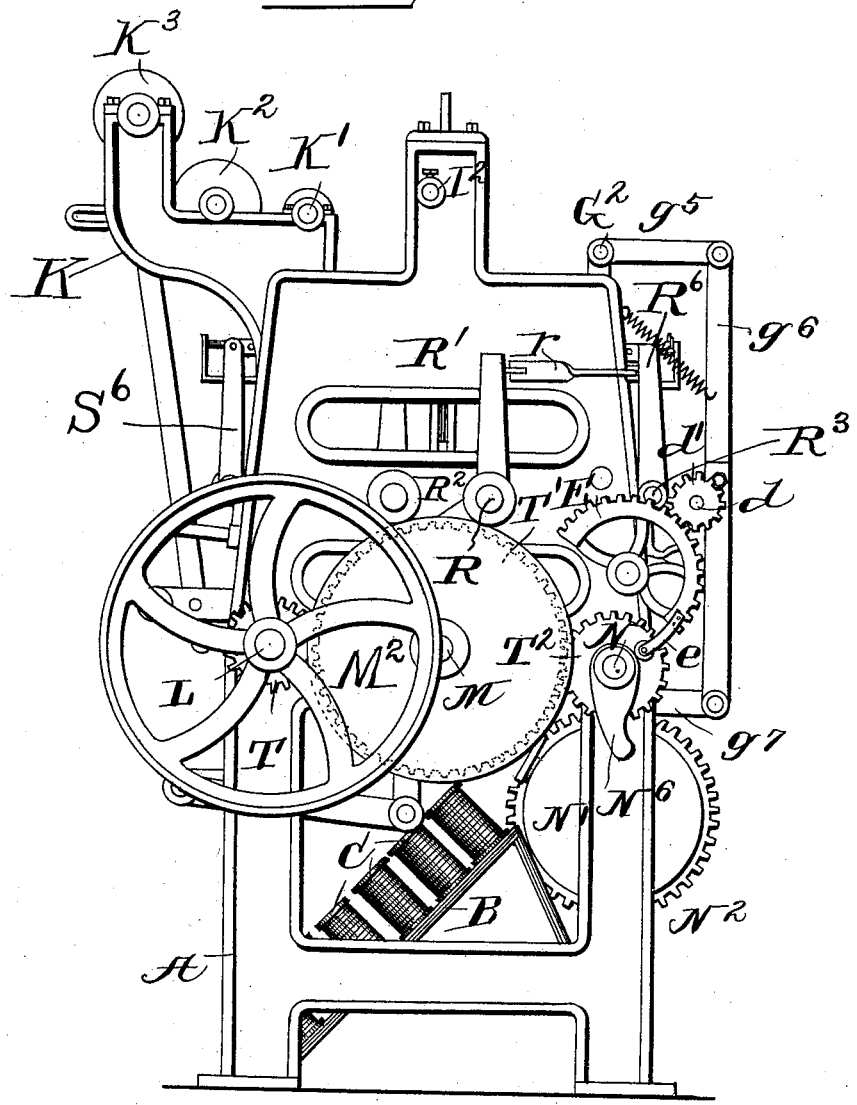
Figure 4:
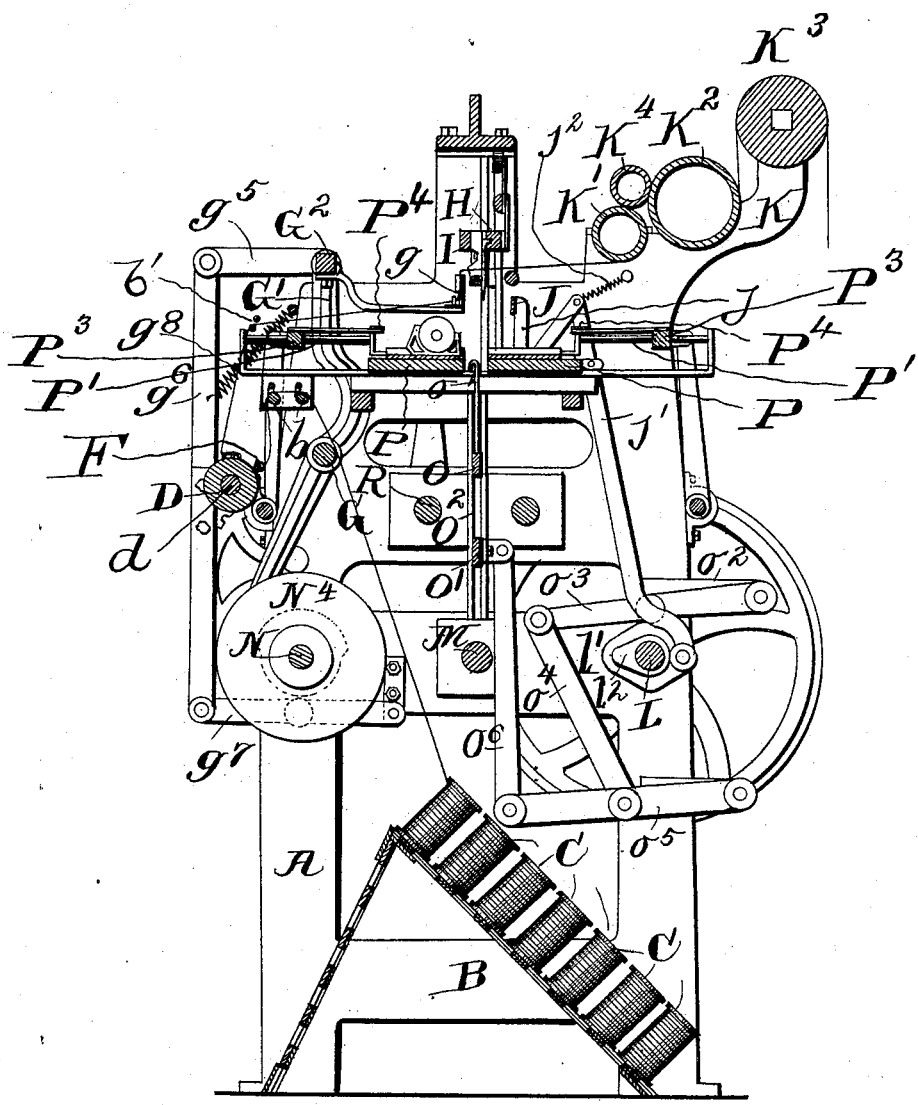

In the drawings, Figure 1 is a front elevation of a netting-machine embodying my invention. Fig. 2 is a view in elevation of the right end of the machine. Fig. 3 is a view in elevation of the left end of the machine. Fig. 4 is a vertical section from front to rear of the machine. Fig. 5 is a partial vertical section from left to right through the machine. Fig. 6 is a detail of the cord-carriers and their operating mechanism. Fig. 7 is a partial section from front to rear illustrating the shuttle and shuttle-driving mechanism. Fig. 8 is a plan view of a single shuttle-driver. Fig. 9 is an enlarged section of one of the shuttles. Fig. 10 is an end view of one of the shuttles as it appears in its raceway. Fig. 11 is a view of the upper end of one of the drawing-down hooks. Fig. 12 is a detail showing the drawing-down hooks and their supporting-frame and the hook cast-off. Fig. 13 is an enlarged detail view, in perspective, of a part of the finger-bar. Fig. 14 is a like view of a part of the finger-bar and a part of the cast-off bar, the fingers not being shown below the bars. Figs. 15 to 18, inclusive, are details of cams. Figs. 19 and 20 are partial views, in perspective, of the finger-bar and cord-carrier, illustrating the method of forming loops for the shuttles. Fig. 21 is an enlarged view of a loop formed by the loop-forming devices.

In my present machine the knots and meshes of the netting are formed, as usual, from warp-threads, extending through the machine from front to rear, which are knotted to shuttle-threads. The shuttles and shuttle-threads are one more in number than the warp-threads and the meshes are formed by knotting the two sets of threads together, so that there will be at each selvage, alternately, a shuttle-thread not knotted to a warp-thread. In other words, at one knotting operation there will be a shuttle-thread at the right selvage, which will not be knotted to a warp-thread, and at the next operation there will be a shuttle-thread at the left selvage not knotted to a warp-thread, and so on throughout the consecutive operations of the machine.

In the drawings, A A indicate the end pieces or standards, which may be of any suitable or preferred construction and which are united at convenient points with suitable connecting-bars or tie-rods to form a rigid supporting-frame. At the rear of the machine is placed in suitable bearings in the end pieces or standards of the frame a main driving-shaft L. This shaft is provided with a spur-gear T, which gears with a toothed wheel T' on a shaft M, and this wheel gears with a spur-wheel on shaft N at the front of the machine. All the moving parts of the machine are operated from these shafts.

Within the frame and near the bottom thereof I place an inclined support B, having suitable provision for holding bobbins or spools C, containing the warp cords or threads. From these bobbins or spools the warp-threads extend to the front of the machine over two rods or bars *b b*, one or both of which is provided with a guide-eye for each thread, thence downward to a warp-tension device, thence upward over a rod or bar *b'*, preferably provided with guide-eyes for the cords or threads, and thence to the cord-carrier and the mesh-forming point, the netted fabric extending therefrom to the take-up mechanism.

The group of devices which I term the "take-up" mechanism is best shown in Figs. 2 and 4. On rearwardly-extending portions of the frame K are mounted the take-up rollers K', K², and K³, the shafts of which are journaled in suitable bearings in or attached to the frame extension, and a loose or free roller K⁴ rests upon and partially between the rollers K' and K² and engages the peripheries of both. These rollers I prefer to actuate from the main driving-shaft L through the following instrumentalities: The shafts of the rollers K', K², and K³ project beyond the frame at one end of the same. The shaft of roller K² is provided with a gear-wheel $k$ and a ratchet $k'$. The shaft of roller K³ is provided with a gear-wheel $k^4$, and idler wheels or pinions $k^5$, mounted on studs secured to the frame, operatively connect the wheels $k$ and $k^4$. The shaft of roller K' is provided with a gear-wheel $k^2$, and an idle-wheel $k^3$ connects it with the gear-wheel $k$ on the shaft of roller K². An arm or lever $k^6$ is pivoted on the shaft of roller K², which is provided with a pawl $k^7$, engaging the teeth of the ratchet $k'$. The arm or lever $k^6$ is slotted and a link K⁵ is pivoted thereto by a bolt passing through the slot. This link extends downward and is pivoted to a lever $k^6$, which is pivoted to the frame of the machine at $k^8$. The lever near its rear end is provided with a friction-roll $k^9$, which engages a cam $l'$ on the main or driving shaft L. The pawl $k^7$ is so constructed and placed that the ratchet $k'$ is engaged thereby and the take-up mechanism operated when the lever K⁶ and link K⁵ are raised by the cam, the weight of the parts being sufficient to return them to their lowest position when the friction-roll has passed the elevated portion of the cam. By adjusting the link K⁵ in the slot of arm $k^6$ the extent of the movement given the take-up rollers is increased or diminished, as desired.

The netting or completed fabric as it comes from the knotting devices passes under and partially around roller K', over and partially around the loose or free roller K⁴, under and partially around roller K², and then over roller K³. The loose roller presses upon the netting with its entire weight and grips it with sufficient force to draw the knots tight, when it is desired to do so, as well as to advance the warp-cords the proper space for another mesh.

Forward of the take-up mechanism at the top of the machine are located the finger-bar H and the cast-off bar I. (See Figs. 4, 7, 13, and 14.) The cast-off bar is rigidly supported from the framing of the machine. The finger-bar H is movably supported close to and parallel with the cast-off bar. The finger-bar is provided with fingers $h$, which are secured to the front side of the bar. The fingers $h$ I term "cord-receiving fingers," as the cord is laid upon them in the operation of forming the knots. These fingers are best shown in Figs. 13, 19, and 20, and as there shown may be briefly described as of U shape in cross-section or as having three sides, one of which connecting the other two may be termed the "back," and this back lies against the front side of the finger-bar H, with the others projecting forward from the bar. In the drawings the three sides are shown as being straight; but this is not essential, as the sides might be of other outline. The sides might be curved or the finger might be constructed in the shape of a circular or oval tube with a slot at the front.

While I prefer the forms described, the essential feature is that each finger have two sides with a space between them, the said sides having their greatest extent from front to rear of the machine.

Each finger is accompanied by a point $h'$, extending below the finger. I have shown these points as formed on pins lying along the back of each finger; but instead the point may be made integral with and form a part of the finger or may be secured directly thereto. These points I term the "knot-controlling points," as the location of the knot upon the shuttle-cord is controlled thereby.

Each side of the finger, near its lower end, has a cord-holding projection $h^2$, which when the cord is laid upon the finger below them prevents it being raised or carried upwardly out of position. Above this shoulder or projection each side is provided with a cord-notch $h^3$, the lower edge of the notch being very long and inclining outwardly, as shown, while the upper edge is approximately at right angles to the finger and forms a square shoulder. Each finger is provided near its lower end with a small opening $h^4$, through which project cord-supporting lugs or projections $h^5$. These project outward from the lower end of an elastic strip or spring $h^6$, secured on the inner side of each side of the finger. These springs I term "movable" or "spring-cord" supports. Each spring $h^6$ is provided above with a cam projection $h^7$, extending outward beyond the side of the finger to which it lies adjacent through one of the cord-notches $h^3$.

In the operation of forming the knots the warp-cords are wound around the lower ends of the fingers $h$, and when the knots are completed are cast off through the upward movement of the finger-bar and acting in connection with the stationary cast-off bar I. At each end of the machine there is provided a vertically-disposed guide H', with which the ends of the finger-bar movably engage. Near each end of the finger-bar a pair of toggle-levers I' I' connect the finger-bar H with the cross-bar A' of the frame. The central pivots of the toggle-levers are connected by links $i'$ $i'$ with a bar I², sliding in bearings at the sides of the machine. This rod or bar I² (see Fig. 5) extends to the right beyond the frame of the machine and is provided with two collars $i^2$ $i^2$, adjustably secured to the rod by set-screws. At the same end of the machine a bracket I³ extends outward from the frame, and to this bracket is pivoted a lever I⁴. This lever is forked at its upper end and extends on both sides of the rod I², between the collars $i^2$ $i^2$. Its lower end is provided with a friction-roll $i^3$, which bears against the outer face of the cam-disk M', mounted on the shaft M at the right side of the machine. This disk has two cam projections $m\ m$ in the path of the friction-roller and by engagement therewith forces the rod or bar $I^2$ inward, flexing the toggle-levers and raising the finger-bar. The weight of the bar will ordinarily be sufficient to return the bar to its lower position and to maintain the friction-roller in contact with the cam-disk; but I may provide a spring, as $i^4$, upon the rod or bar $I^2$ between the inner collar $i^2$ and the frame of the machine to insure this action of the parts.

The cast-off bar I is provided on its side lying adjacent to the finger-bar H with projections $i\ i$, which extend rearwardly from the cast-off bar between the fingers $h$ on the finger-bar. These projections lie close to the sides of the fingers, and as the finger-bar is raised the cam projections of the spring-cord supports come in contact therewith and are forced inward, withdrawing the movable cord-supports.

At the front of the machine a shaft G is mounted in suitable bearings at each end of the machine, so as to rock and slide therein, (see Figs. 4 and 6,) and to this shaft are rigidly secured upwardly-extending arms $G'\ G'$, in the upper ends of which is journaled a bar $G^2$. To the rear of this bar are the cord-carriers $g\ g$, which consist of vertically-disposed guiding tubes or eyes carried by vertical standards or stems $g'$, (see Fig. 7,) through which are threaded the warp threads or cords. These cord or thread guides are rigidly connected to and supported by the bar $G^2$, and this connection may be of any preferred form. Each cord or thread guide may have a separate connection with the bar $G^2$, or they may all be mounted on a single bar or plate connected with the bar $G^2$, and this latter construction is shown in the drawings, all of said cord-guides being secured to a bar $G^3$, each end of which is connected with the bar $G^2$ by an arm $g^3$. These arms have their rear ends in a considerably-lower plane than the plane of the bar $G^2$ to enable the cord or thread guides to be placed at a sufficient distance above the bar $G^3$ to enable the bar to pass beneath the points or pins $h'$, and yet permit the thread-guides to be raised to the necessary height to properly place the cord upon the fingers in the operation of knotting. To place the cord upon the fingers in the manner contemplated, the cord or thread guides are given lateral movements from one toward the other end of the machine and back, and from front to rear and reverse, and the cord-guides must also be raised and lowered at certain parts of their movement. These movements are effected by the following instrumentalities: The movements from one end of the machine toward the other are effected by the grooved cam $N'$, which is mounted on a stud projecting from the frame of the machine below the shaft N. This cam is provided at its outer side with the gear-wheel $N^2$, gearing with the pinion $N^3$, mounted on the outer end of shaft N. The gear-wheel $N^2$ is provided with double the number of teeth of pinion $N^3$, so that the cam makes but one revolution to two of the pinion. A lever $G^4$ is pivoted to a bracket projecting from the frame of the machine and has at its lower end a friction-roll engaging the groove of the cam $N'$. The upper end of the lever $G^4$ is bifurcated, the two parts of the lever extending upward, one on each side of and pivoted to a short sleeve $G^5$ on the shaft G. The sleeve $G^5$ is held in position upon the shaft G by two collars $g^4\ g^4$, adjustably secured to the shaft G by set-screws. It will be seen that by this construction the shaft G is free to turn in either direction, while it can be moved longitudinally by the lever when actuated by the grades of the cam $N'$, and that the cord-guides $g$ are so connected with this shaft as to participate in its movement.

The movements of the cord-guides toward and from the rear of the machine are effected by the following means: The arms $G'$ are extended below the shaft G, as shown in the drawings, or separate arms rigidly extend below the shaft G and are provided at their lower ends with friction-rolls which engage cam-grooves in the sides of cam-disks $N^4$ on shaft N. These extensions are lettered $G^5$ in the drawings. The cam-guides of these cam-disks are formed so as to oscillate the shaft G to give the cord-guides the proper movements backward and forward.

I secure the upward and downward movements of the cord-guides by means of the following constructions: The bar $G^2$ is provided at each end with a forwardly-extending arm $g^5$. (Best seen in Fig. 4.) A link $g^6$ is pivoted to the outer end of each arm $g^5$ and extends downwardly and is pivoted to the forward end of a lever $g^7$, whose rear end is pivoted to the frame of the machine. This lever passes under the shaft N and is provided with friction-rolls adapted to engage cams $N^5$ on shaft N. These cams have their grades on their peripheries, and the friction-rolls of levers $g^7\ g^7$ are maintained in contact with said cam-grades by springs $g^8\ g^8$, secured at one end to the links $g^6\ g^6$ and at their opposite ends to a stationary part of the machine. The cam-grades acting on the friction-rolls depress the levers $g^7$ and the links $g^6$, and the springs retract them when the rolls come opposite the depressed portions of the cams, and thus the bar $G^2$ is rocked and the cord-guides raised or lowered, as desired.

During the tightening of the knots I put a draw upon the warp-cords at the front of the machine. To accomplish this, I locate a roller D at the front of the machine. The top of this roller is provided with guides for the warp-thread, each guide consisting of two square staples set at opposite angles of inclination to the line of the cord in passing therethrough. The shaft $d$ of the roller D extends at the left end of the machine beyond the frame and is provided with a spur-pinion $d'$. (See Fig. 3.) Geared with this pinion is a toothed sector E, mounted on a stud projecting from the frame of the machine. One end of this sector is provided with an extension $e$, and a friction-roll connected therewith engages with a cam $N^6$ on the shaft N. When the higher portion of the cam comes in contact with the friction-roll of the extension $e$, the sector is turned, revolving the tension-roll D toward the front of the machine, causing the cords to assume a sharper angle after passing through the guide-loops upon it, thereby effecting a strong draw upon the threads, very materially assisting in tightening the knots. As soon as the point of the cam passes the extension $e$, the pull of the take-up mechanism causes the roller D and sector E to assume their normal positions.

In order to secure an even tension upon the warp-cords, I pass these cords under a bar or rod F, which is supported by the warp-threads. This bar is free to rise or fall and its weight gives the desired tension. If preferred, the warp-cords may each be provided with an individual weight; but I prefer the construction just described. After the cords have been properly placed upon the fingers a portion of the cord is drawn down to form a loop, through which a shuttle is to be passed to complete the knot. This is effected by a series of drawing-down hooks $o$ $o$, secured in a vertical position upon a frame O, mounted upon a bar $O'$, (see Fig. 12,) which movably engages vertically-disposed guides $O^2$ at each end of the machine. The hooks $o$ are of the form shown enlarged in Fig. 11 and each is provided with a pivoted latch $o'$, adapted to be turned upward over the point of the hook. The proper movements of the hooks are effected by the cams $l'$ $l'$ on the shaft L through the following connecting mechanism: To rearwardly-extending brackets $o^2$, one at each end of the machine, are pivoted levers $o^3$, having friction-rolls engaging cams $l'$ $l'$. The forward ends of the levers $o^3$ are connected by links $o^4$ to levers $o^5$, pivoted to brackets in a similar manner to that of levers $o^3$. The forward ends of these latter levers are connected by links $o^6$ with the bar $O'$. The weight of the hooks, their supporting-frame, bar $O'$, and the links and the levers is such that the friction-rolls of the levers $o^3$ are kept in contact with the cams $l'$ and the hooks thereby maintained in the lowest position permitted by the said cams. As the rolls follow the cams, the hooks descend without shock or jar. After the loops have been formed by the drawing-down hooks the knot is to be completed by passing a shuttle-thread through the loop. This is accomplished by causing a shuttle to pass through the loop, leaving its thread therein to be drawn into the knot.

The shuttles and their supporting, guiding, and operating mechanism are best shown in Figs. 2, 3, 4, 7, 8, 9, and 10. Beneath the cord-fingers and the cord-guides is located a divided shuttle-bed P, having as many shuttle-raceways as there are fingers $h$ on the bar H, each raceway being directly below a finger. The form of these raceways is best shown in Fig. 10, they having straight vertical sides, each raceway being of considerable depth. The shuttles Q are of a form to fit these raceways and move easily in them. The shuttle-bed is divided into two parts separated by a narrow open space, through which the hooks $o$ pass in their upward and downward movements. The shuttles are made of such a length as to easily pass from the portion of the raceway on one side of the bed to that on the other across this open space. Each shuttle is otherwise of ordinary construction and is made to contain a bobbin filled with cord of the appropriate size and quality. This bobbin may be retained in the shuttle by any preferred means. I have shown a lid $q$, which will serve this purpose, and this lid is preferably provided with cord or thread guides $q'$, through one or more of which the cord is threaded.

The shuttles are moved to and fro in their raceways at the appropriate times by two shuttle-drivers, one at the front and one at the rear of the machine. One of these shuttle-drivers is shown in plan view in Fig. 8 and its construction is described, as shown in and its parts fully lettered in that figure only, it being understood that the other driver is of a like construction, having corresponding parts.

At each end of the shuttle-bed a bar $p'$, secured to the under side of the same, extends outwardly and has at its outer end the vertically-disposed portion $p^2$. A rod $P'$ extends inwardly from the upright part $p^2$ of this bar and has its inner end secured to an upright $p^3$, secured to the upper side of the shuttle-bed. Upon the rods $P'$ is movably mounted a bar $P^3$, to which are secured arms $p^4$, carrying at their inner ends a bar $P^4$ of such length as to engage all of the shuttles. The shuttle-driver at the front of the machine is operated by the following instrumentalities: At the left end of the machine two arms $R'$ $R^2$, rigidly connected, forming a modified bell-crank lever, are pivoted on a stud or shaft R. To the latter they may be rigidly secured, if desired. The arm $R^2$ is provided with a friction-roller, which engages with a cam-groove on the inside of the cam-disk $M^2$ on the shaft M. This cam is shown in Fig. 15, which shows the inner face of the cam-disk $M^2$. A shaft $R^3$ is mounted in bearings in the frame of the machine. This shaft has within the frame two upwardly-extending arms $R^4$ $R^5$, and these arms are connected with the bar $P^3$ by links $r'$ $r^2$. (See Figs. 5 and 8.) The shaft $R^3$ has outside of the frame an arm $R^6$, which is connected with the upwardly-extending arm $R'$ on the shaft or stud R by a link $r$.

The shuttle-driver at the rear of the machine is actuated by means of the following arrangement of mechanism: A similar bell-crank lever having arms $S'$ $S^2$ is mounted in a like manner at the right end of the machine on a shaft or stud S. The arm $S^2$ is also provided with a friction-roll, which engages a cam-groove on the inner side of the cam-disk M' previously referred to. The arm S' of the bell-crank lever is connected by a link $s$ with an arm $S^4$ on a shaft $S^3$ at the rear of the machine, and this shaft has two arms $S^5 S^6$, which are connected by links with the bar $P^3$ of the rear shuttle-driver.

Before the knots can be fully tightened the cords must be freed from the drawing-down hooks. I force the loops forward out of range of the hooks by a hook cast-off bar J. This bar extends the whole length of the shuttle-bed and is secured at each end to one of the arms of a bell-crank lever $j$. The rearward arm of each lever $j$ is pivotally connected to the upper end of a lever $j'$. These levers are pivoted to the shuttle-bed and extend downwardly to the rear of shaft L and are provided at their lower ends with friction-rolls engaging cams $l^2 l^2$ on the shaft L. A spring $j^2$ is connected to the upper end of each lever $j'$, and the opposite end of each spring is secured to a stationary part of the machine, so that the friction-rolls of the levers are maintained in contact with their operating-cams.

Having described the construction of the machine which constitutes my present invention, I will now proceed to describe its operation in detail in the process of making nets.

The threads from the bobbins C are threaded by taking them as directly as possible to the bars $b\,b$ at the front of the machine and threading them through the guide-eyes on said bars, thence under the bar F or through the eyes of weights, thence through the guide-eyes of the tension-roll D, thence through the eyes on the bar $b'$, thence through the guide-eyes $g^2$ on the stems or standards $g'$ of the cord-guides, thence through the cord-guides, and thence rearward upon the take-up rolls $K' K^2 K^3$ and beneath the roller $K^4$, whose weight grips them and holds them fast. The shuttle-cords having been also placed so as to be gripped and held by the take-up mechanism, the machine is ready to start. The cord-fingers $h$ are one more in number than the cord-guides, and the cord in passing rearwardly from each cord-guide to the take-up mechanism passes between two of the fingers $h$. In the normal position of the cord-guides the cord is held slightly above the cord-supporters projecting through the sides of the fingers. The cord of each cord-guide is first laid upon the finger at one side of it and then upon the finger at the other side. In Fig. 20 there are shown two fingers $h$, an intervening finger being broken away to make the drawings more clear. Upon the finger at the right in the figure has been illustrated the method of laying the cord upon the finger to the right of the warp-cord and on the finger at the left in the figure has been illustrated the method of laying the cord upon the finger to its left. Supposing that the position of the parts is such that the cord is next to be laid upon the finger to the right, upon starting the machine the cord-guide is moved by cam N' and lever $G^4$ to the right past the finger, first drawing the cord against the finger above the cord-supporter at that side of the finger and then in front of the finger below the cord-holding projections $h^2 h^2$. The cord-guide is then moved by the cams $N^4$, acting on the arms $G^5$, rearwardly past the finger, drawing the cord firmly against the front of the finger and laying it above the cord-supporter at that side of the finger. The cam N' then acts to move the cord-guide to the left past the finger in rear of the same, the cams $N^5$ permitting the springs $g^8$ to raise links $g^6$ and lower the cord-guide, so that they will pass beneath the portion of the cord extending rearwardly from the finger. The cams $N^4$ again act and bring the guides forward, the cams $N^5$ at the same time raising the guide. As soon as the guide has moved forward far enough to clear the finger the guide is again moved to the right, laying the cord upon the lower inclined edges of the cord-notch $h^3$, and when the guide has moved to the right past and clear of the finger the guide is moved slightly rearward, placing the cord in the position shown at the right in Fig. 20. While these movements have been taking place, the shuttle-driver at the front of the machine has been operated to force the shuttles rearwardly across the open space in the shuttle-bed and has returned to its original position. The hooks $o$ are now moved upward, and as each hook is in line with the interior of the finger it rises within the finger until the point of the hook is above the portion of the cord on the inclined edges of the cord-notch $h^3$ and the end of the latch $o'$ above the portion of the cord lying across the front of the finger below the cord-holding projections $h^2$. The hooks $o$ then descend, the hook engaging the portion of the cord below it, while the latch is engaged by the cord below it, and as the hooks descend the latch is turned up against the point of the hook, thereby securing the passage of the hook below the part of the cord extending across the front of the finger below the cord-holding projections $h^2$ without engaging with it. As soon as the hook is below this portion of the cord, the latch drops of its own weight to the position shown in Fig. 11. At the conclusion of the movement of the drawing-down hooks each warp-thread has been caused to assume somewhat the form shown in Fig. 21. The shuttle-driver at the rear of the machine is then actuated and the shuttle forced forward through the loops of cord still held by the drawing-down hooks, and at the same time the cord-guides are returned to their normal position. As soon as the shuttles have passed through the loops held by the drawing-down hooks the tenson-roll begins to revolve in order to draw the loops tight. At this time the hooks commence to rise, holding on to the loops, while the tension-roll continues to move, the said roll thereby taking up the slack as it is yielded up by the hooks. At a given point the bar, which knocks the loops off the hooks, moves forward. At the time the said bar comes in contact with the loops to knock them off the hooks the tension-roll slacks, in order to allow the hooks to leave the loops. Then when the loops are cast off the tension-roll resumes its former speed. The amount of slack cast off the hooks is about one and one-half inches or two inches, instead of twelve or thirteen inches, as in the netting-machines now in general use. The taking up of the slack cord while the hooks are rising prevents tangling in rough and hard-twisted cord and greatly facilitates the work at this stage in the operation. When the slack is all taken up, the finger-bar begins to rise, whereupon the cord-supporters are retracted into the fingers, and the tension on the warp-cords causes the cord wrapped around each finger to fall below the main portion of the finger onto the point $h'$ and then off the said point, the tension-roll continuing its movement until the finger rises out of the knot. As soon as the points are drawn out of the knots, the finger-bar returns to its former position. At this stage of the operation the take-up mechanism begins to move and draws the knotted cords as far forward as is required for the formation of another row of meshes. As soon as the knots are tightened upon the points $h'$ of the finger-bar the finger-bar is raised to withdraw the points from the knots. This is done before the take-up mechanism has ceased to act, and the further movement of these devices finish the knot, on the accomplishment of which the tension-roll is relieved and the take-up devices continue their movement, feeding the warp-threads along the proper distance for a mesh of the net. The finger-bar then returns to its normal position. When a shuttle is passed through a loop on both movements, care has to be taken that the construction and appliances at both sides of the slot through which the drawing-down hooks and their loops pass shall be such as to prevent the possibility of any entanglement of the cords. By having the shuttle pass through the loop only in one direction the arrangement of parts in this respect is simplified. As has been before stated, the shuttles are one more in number than the cord-guides and warp-threads, and during the operation just described no knot has been made by the shuttle-thread at the left selvage of the fabric. As the motion of the machine continues for the next knotting mechanism, the cord-guides are carried past the front of the finger to the left, and the same movements are repeated to lay the cord in a like manner upon the finger to the left of the cord, the movements being the reverse of those before described. The other movements of the machine are the same as those just described. In this operation no knot is made with the shuttle cord or thread at the right selvage of the machine. At the next operation the shuttle cord or thread at the left selvage is not knotted, and so on. The reversal of the movements of cord-guides is effected by the cam N', which is made large enough to permit the groove to be constructed with the requisite cam-grades to effect the movements required.

While I have shown and described the best form in which I have at this time contemplated embodying my invention, it is obvious that the form and proportions of various parts may be varied to a considerable extent without departing from the principle of my said invention.

I have further contemplated constructing various parts of the operating devices so that the movements of many of the devices can be adjusted. For example, the links $g^6$ are made in two parts, so that they may be adjusted to vary the height of the movement of the cord-guides. The links $r$ and $s$ may also be made so as to provide for the adjustment of the range of movement of the shuttle devices. These provisions for adjustment of the parts have been considered and are within the scope of my invention.

It is to be noted that the points $h'$ of the fingers play an important part in that they secure the closing of the knots in a single line upon the shuttle threads or cords, insuring uniformity in the meshes of the netting.

While I prefer to provide each cord-receiving finger with two spring cord-supports, this is not absolutely essential, as one on each would in most cases be found adequate.

What I claim, and desire to secure by Letters Patent, is—

1. The herein-described cord-receiving finger for netting-machines, having two fixed sides with a space between them and also having in front thereof a notch or depression into which a portion of the cord wrapped around the finger may be laid and thereby placed in position to be engaged and drawn down by a loop-forming device passed up within the finger, substantially as described.

2. The herein-described cord-receiving finger for netting-machines upon which the cord is wrapped, having a knot-controlling point below that portion of the finger on which the cord is wrapped.

3. The herein-described cord-receiving finger for netting-machines, having three sides or being of U shape in cross-section.

4. The herein-described cord-receiving finger for netting-machines, having three sides or being of U shape in cross-section and having a cord-controlling point below that portion of the finger whereon the cord is wrapped, substantially as described.

5. The herein-described cord-receiving finger for netting-machines, provided with a spring cord-support.

6. The herein-described cord-receiving finger for netting-machines around which the cord is wrapped, having fixed sides provided with a cord-holding projection preventing displacement of the cord by moving upward on the finger.

7. The combination, with the finger-bar and finger, of the spring cord-support having a cam projection extending outward beyond one of the sides of the finger and the finger cast-off bar having a projection lying adjacent to the same side of said finger, one of said bars being movable, substantially as described.

8. The combination, with the cord-receiving finger having two sides with a space between them and a cord-notch, of the latched drawing-down hook, substantially as described.

9. The herein-described cord-receiving fingers for a netting-machine, having two sides, and two spring-cord supporters within said finger, having projections extending outward through apertures in said sides.

10. In a netting-machine, the combination, with cord-receiving fingers, drawing-down hooks, and shuttles equal in number, of a series of cord-guides, one less in number, and operating means therefor, substantially as described.

11. In a netting-machine, the combination, with the loop-forming devices, of shuttles, two shuttle-drivers, and operating mechanism for moving one shuttle-driver before the loops are formed and the other for moving the shuttle through the loops, substantially as described.

12. In a netting-machine, the combination, with the loop-forming devices including drawing-down hooks among its members, of the pivoted hook cast-off bar and operating means, substantially as described.

13. The combination of a movable finger-bar having fingers thereon, a hook cast-off bar, hooks for drawing down the loops, mechanism for raising the hooks, with the cord engaged with the hooks, and a tension device constructed to take up the slack of the loop while the hooks are rising and before the cord is cast off the hooks.

In testimony whereof I affix my signature in presence of two witnesses.

WILLIAM J. HOOPER.

Witnesses:
D. C. REINOHL,
FELIX R. SULLIVAN.